US012056628B2

(12) United States Patent
Wase et al.

(10) Patent No.: US 12,056,628 B2
(45) Date of Patent: Aug. 6, 2024

(54) REAL-TIME SPACE RESERVATION USING AUGMENTED REALITY

(71) Applicant: INTERNATIONAL BUSINESS MACHINES CORPORATION, Armonk, NY (US)

(72) Inventors: Vincent Wase, Verona, NJ (US); Sal M. Rosato, Pine Plains, NY (US); Michael Domitrovits, New Paltz, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 141 days.

(21) Appl. No.: 17/411,241

(22) Filed: Aug. 25, 2021

(65) Prior Publication Data
US 2023/0067076 A1 Mar. 2, 2023

(51) Int. Cl.
*G06Q 10/02* (2012.01)
*G06T 19/00* (2011.01)
*G06Q 10/1093* (2023.01)

(52) U.S. Cl.
CPC ........... *G06Q 10/02* (2013.01); *G06T 19/006* (2013.01); *G06Q 10/1095* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 2009/0300174 A1 | 12/2009 | Floris | |
| 2015/0012307 A1* | 1/2015 | Moss | G06Q 10/02 705/5 |
| 2019/0026659 A1 | 1/2019 | Yakubovich | |
| 2019/0220665 A1* | 7/2019 | Neumann | G06Q 10/02 |
| 2019/0325355 A1 | 10/2019 | Gladwin | |

FOREIGN PATENT DOCUMENTS

EP  3955163 A1 * 2/2022 ......... G06K 9/00798

OTHER PUBLICATIONS

Bookado, "Smart management of your office space," [Accessed Jul. 3, 2021], 7 pages. https://bookado.io/#.

(Continued)

*Primary Examiner* — Tapas Mazumder
(74) *Attorney, Agent, or Firm* — Rakesh Roy

(57) ABSTRACT

A method, computer system, and a computer program product for real-time space reservation using augmented reality (AR) is provided. The present invention may include, receiving, by an AR device, a visual input of a user environment. The present invention may include, correlating, by the AR device, the received visual input with reservation data associated with the user environment. The present invention may include, displaying, by the AR device, an augmented view of the user environment including at least one reservation status linked to a corresponding space in the user environment. The present invention may include, receiving, by the AR device, a reservation request based on the augmented view of the user environment.

20 Claims, 7 Drawing Sheets

(56) References Cited

OTHER PUBLICATIONS

22Miles, "Three Technology Features that are Improving the Visitor Experience," [Accessed Aug. 24, 2021], 6 pages. https://www.22miles.com/blog/new-standard-wayfinding-technology-features/.
Disclosed Anonymously, "System Method and Apparatus for Smart Building Dynamic Sitting," IP.com No. IPCOM000263326D, IP.com Electronic Publication Date: Aug. 18, 2020, 3 Pages.
Author Unknown, "The Workspace Revolution," Bookker, [Accessed Jul. 3, 2021], 8 pages. https://uploads-ssl.webflow.com/5f678a7a2f771809d5eed74e/5fae58109d998653ab6f2fc5_covid-19-dossier.pdf.
Author Unknown, "Desk Booking Software", Condeco, Retrieved from Internet on Aug. 24, 2021, 21 Pages. https://www.condecosoftware.com/campaigns/desk-booking-software/?gclid=EAlalQobChMlntOCupLK7gIVdOW1Ch3hEA7EEAAYASAAEgL1UPD_BwE&gclsrc=aw.ds.
G. Bouvigne, "Meeting Room Suggestions For Conference Calls," IP.com No. IPCOM000249692D, IP.com Electronic Publication Date: Mar. 20, 2017, 5 pages.
Author Unknown, "Desk Booking Software", Robin Powered, Inc., Retrieved from Internet on Aug. 24, 2021, 3 Pages. https://pages.robinpowered.com/schedule-demo-ga-desk-booking?
Ward et al., "A Real-time Application to Predict and Notify Students about the Present and Future Availability of Workspaces on a University Campus," In Proceedings of the 2015 ACM SIGUCCS Annual Conference (SIGUCCS 15), Association for Computing Machinery, pp. 67-74, 2015.
Author Unknown, AR Indoor Navigation, Viewar, Retrieved from Internet on Aug. 24, 2021, 5 Pages. https://www.viewar.com/ar-indoor-navigation/.
Mell et al., "The NIST Definition of Cloud Computing", Recommendations of the National Institute of Standards and Technology, NIST Special Publication 800-145, Sep. 2011, 7 pages.

* cited by examiner

REAL-TIME SPACE RESERVATION USING AUGMENTED REALITY

BACKGROUND

The present invention relates generally to the field of computing, and more particularly to augmented reality (AR) technology.

After a user reserves a space, the user then needs to navigate to it. This may be difficult for users who may be unfamiliar with the facility or venue in which the reserved space is located. Existing solutions may rely on using a mobile or web application to navigate on a floor plan. Alternatively, Internet of Things (IoT) hardware solutions may be deployed for blue dot navigation. However, the wide-scale deployment IoT hardware may be cost and resource prohibitive.

SUMMARY

Embodiments of the present invention disclose a method, computer system, and a computer program product for real-time space reservation using augmented reality (AR). The present invention may include, receiving, by an AR device, a visual input of a user environment. The present invention may include, correlating, by the AR device, the received visual input with reservation data associated with the user environment. The present invention may include, displaying, by the AR device, an augmented view of the user environment including at least one reservation status linked to a corresponding space in the user environment. The present invention may include, receiving, by the AR device, a reservation request based on the augmented view of the user environment.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
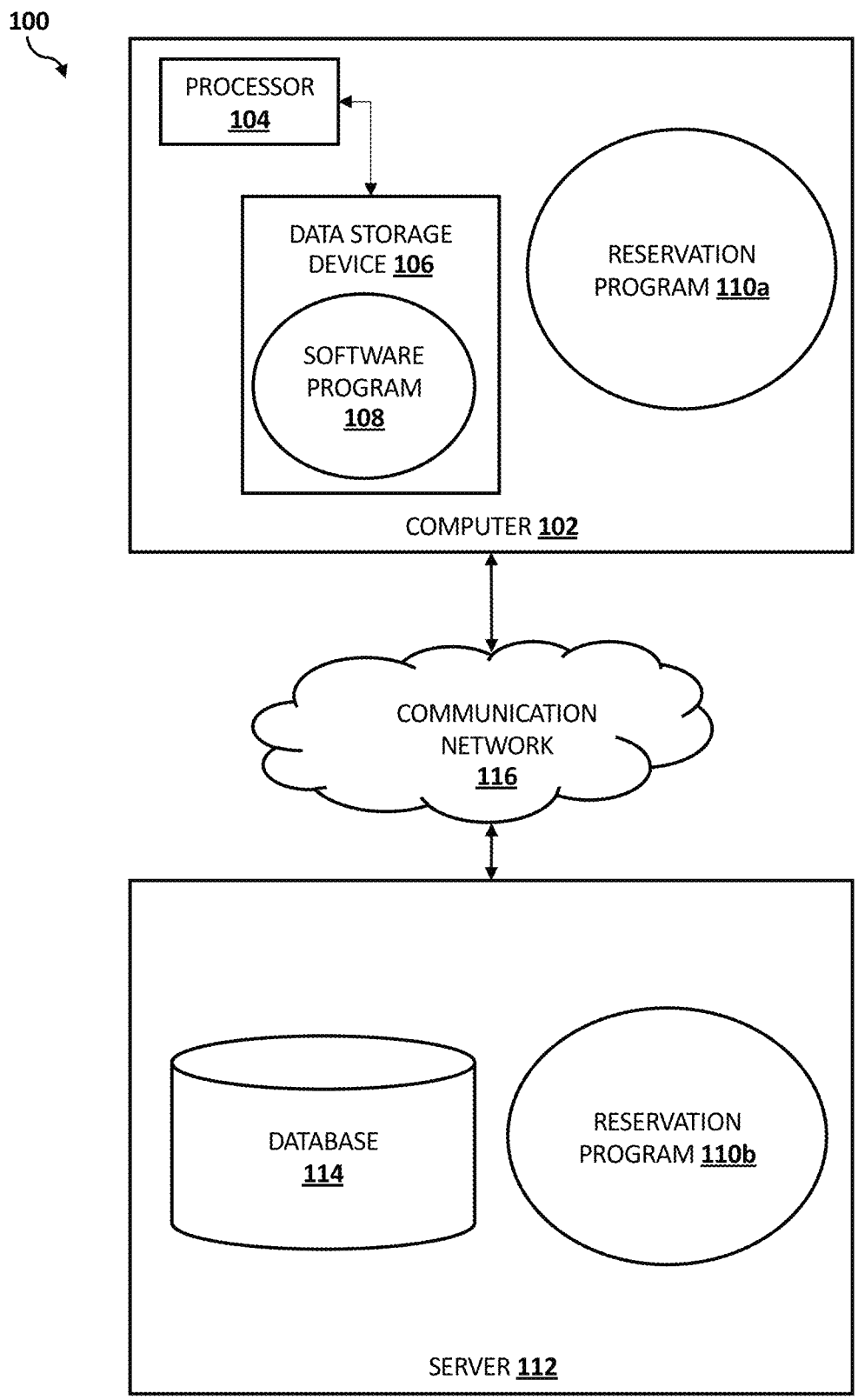
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for real-time space reservation using AR technology. As such, the present embodiment has the capacity to improve the technical field of space reservation by generating a three-dimensional (3D) representation of existing reservation data and incorporating it into an AR view of a user environment to simplify a user's journey for reserving space in the user environment. More specifically, an AR device (running a reservation program) may receive a visual input of a user environment. Then, the AR device may correlate the visual input with reservation data associated with the user environment. Next, the AR device may display an augmented view of the user environment including at least one reservation status linked to a corresponding space in the user environment. Thereafter, the AR device may receive a reservation request from the user based on the augmented view of the user environment.

As described previously, after a user reserves a space, the user then needs to navigate to it. This may be difficult for users who may be unfamiliar with the facility or venue in which the reserved space is located. Existing solutions may rely on using a mobile or web application to navigate on a floor plan. Alternatively, Internet of Things (IoT) hardware solutions may be deployed for blue dot navigation. However, the wide-scale deployment IoT hardware may be cost and resource prohibitive.

Therefore, it may be advantageous to, among other things, provide a commercially scalable solution to visualize space reservation or occupancy status using AR technology.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a reservation program 110a. The networked computer environment 100 may also include a server 112 that is enabled to run a reservation program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the reservation program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the reservation program 110a, 110b (respectively) to visualize a space occupancy status for reservation via an AR view of the user environment. The disclosed embodiments are explained in more detail below with reference to FIGS. 2 to 4.

Figure 2:
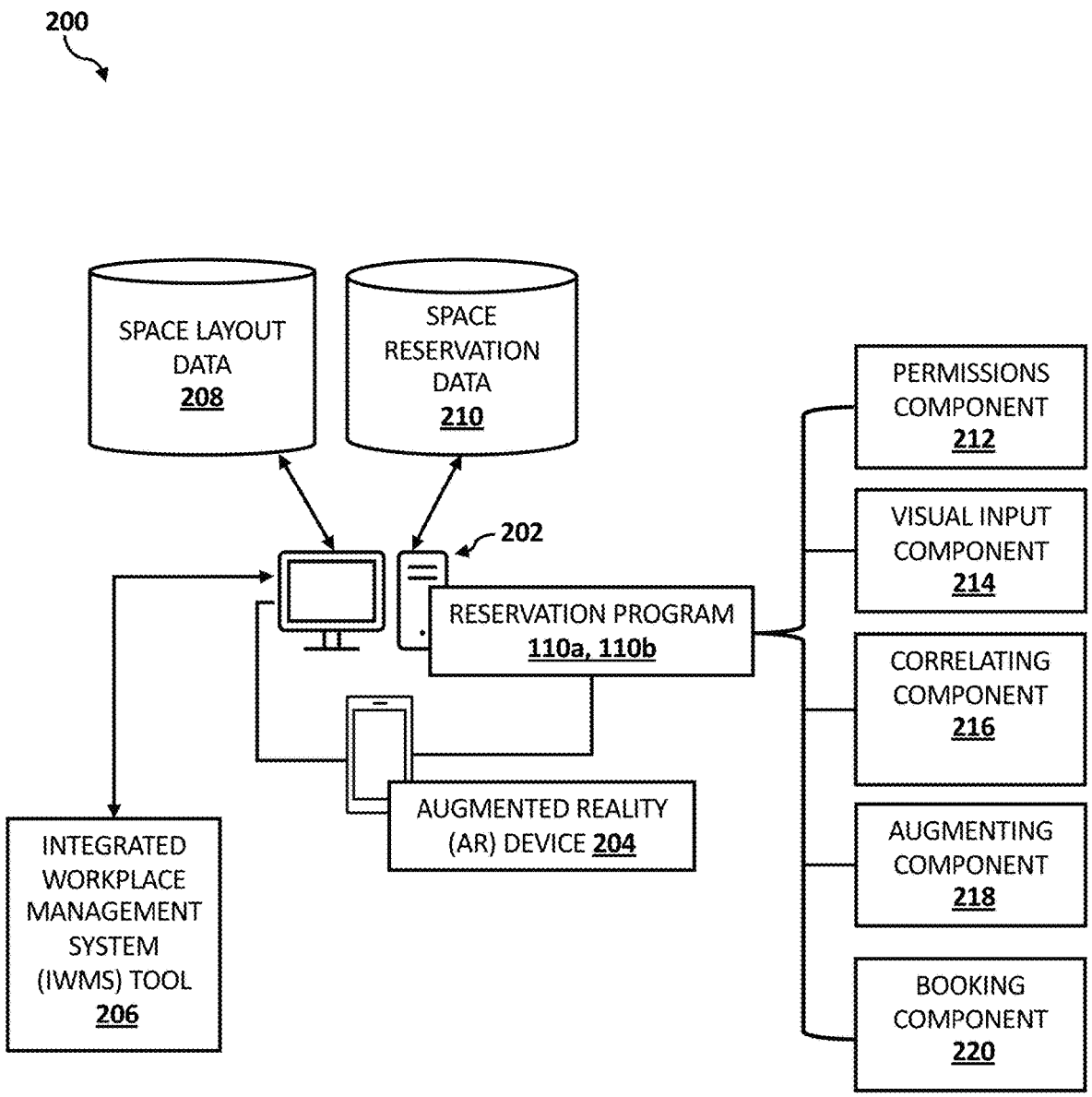
FIG. 2 is schematic block diagram of a facility management environment according to at least one embodiment.

Referring now to FIG. 2, a schematic block diagram of facility management environment 200 implementing the reservation program 110a, 110b according to at least one embodiment is depicted. According to one embodiment, the facility management environment 200 may include one or more components (e.g., client computer 102; server computer 112; communication network 116) of the computer environment 100 discussed above with reference to FIG. 1.

According to one embodiment, the facility management environment 200 may include a computer system 202 having a tangible storage device and a processor that is enabled to run the reservation program 110a, 110b. In one embodiment, the computer system 202 may include one or more client computers 102 and/or one or more server computers 112. In various embodiments, the client computer 102 and/or the server computer 112 of the computer system 202 may include a workstation, a personal computing device, a laptop computer, a desktop computer, a thin-client terminal, a tablet computer, a smart telephone, a smart watch or other smart wearable, or other electronic devices. More specifically, in at least one embodiment, the computer system 202 may include an AR device 204 having a tangible storage device and a processor that is enabled to run the reservation program 110a, 110b, as will be detailed further below. In various embodiments, the AR device 204 may include a heads up display (HUD), a holographic display, a pair of smart glasses, and/or a handheld device, such as, for example, a smartphone or tablet including one or more cameras.

According to at least one embodiment, a "space" for reservation may include a workspace in a facility or any other structure having spaces where people work/interact. In one embodiment, the workspace may include a desk or meeting room which may be temporarily occupied by the user for a period of time. In such embodiments, the reservation program 110a, 110b may interact with an Integrated Workplace Management System (IWMS) tool 206. In one embodiment, the IWMS tool 206 may include a technology platform configured to help organizations optimize the use of workplace resources, including the management of real estate, infrastructure, and facility assets. One example of an IWMS tool 206 is the IBM® TRIRIGA® solution (IBM TRIRIGA and all IBM TRIRIGA-based trademarks and logos are trademarks or registered trademarks of International Business Machines Corporation and/or its affiliates).

In one embodiment, the reservation program 110a, 110b may be implemented as a module within the IBM TRIRIGA solution.

According to one embodiment, the reservation program 110a, 110b may have access to and be configured to retrieve space layout data 208 and space reservation data 210. In one embodiment, the space layout data 208 may include floorplans (e.g., based on computer-aided design (CAD) and building information modeling (BIM) drawings) and workspace layouts (e.g., desk/seating; workstations; meeting rooms). In one embodiment, the space reservation data 210 may include real-time reservation or occupancy status for each workspace in a given environment. In one embodiment, the space layout data 208 and the space reservation data 210 may be provided by the IWMS tool 206.

According to other embodiments, the "space" for reservation may also include seats on an airplane, bus, train, or any other venue in which the seats may be reserved and assigned to specific occupants. In such embodiments, the reservation program 110a, 110b may interact with a space management system tool corresponding to that particular venue. Further, in such embodiments, the space layout data 208 and the space reservation data 210 may correspond to that particular venue.

According to one embodiment, the space layout data 208 and the space reservation data 210 may be distributed over multiple data storage devices (e.g., data storage device 106; database 114) included in the electronic devices (e.g., client computer 102; server computer 112) of the computer system 202 in the facility management environment 200, over multiple data storage devices (e.g., data storage device 106; database 114) external to the electronic devices of the computer system 202 in the facility management environment 200, or a combination thereof. In other embodiments, the space layout data 208 and the space reservation data 210 may be remote, such as on another server available via communication network 116.

According to at least one embodiment, the reservation program 110a, 110b may include a single computer program or multiple program components/modules or sets of instructions being executed by the processor of the computer system 202. The reservation program 110a, 110b may include routines, objects, components, units, logic, data structures, and actions that may perform particular tasks or implement particular abstract data types. The reservation program 110a, 110b may be practiced in distributed cloud computing environments where tasks may be performed by remote processing devices which may be linked through the communication network 116. In one embodiment, the reservation program 110a, 110b may include program instructions that may be collectively stored on one or more computer-readable storage media. As shown in the illustrated embodiment of FIG. 2, the reservation program 110a, 110b may include a permissions component 212, a visual input component 214, a correlating component 216, an augmenting component 218, and a booking component 220.

According to one embodiment, the reservation program 110a, 110b may implement the permissions component 212 to prompt a user (who may opt-in or opt-out) to grant the reservation program 110a, 110b with access to one or more features or data of the AR device 204. In one embodiment, the permissions component 212 may prompt the user for access to a Global Positioning System (GPS) component (e.g., for location data), a clock component (e.g., for time data), an address book component (e.g., for contacts data), a Bluetooth® (Bluetooth and all Bluetooth-based trademarks and logos are trademarks or registered trademarks of Bluetooth SIG, Inc. and/or its affiliates) component (e.g., for Bluetooth data), a Wi-Fi component (e.g., for Wi-Fi data), a microphone component (e.g., for audio data), a camera component (e.g., for digital image data), and any other sensor component (e.g., accelerometer sensor). In one embodiment, the permissions component 212 may enable the user to grant permissions each time the reservation program 110a, 110b is initiated or one time during the initial setup of the reservation program 110a, 110b.

According to one embodiment, the reservation program 110a, 110b may implement the visual input component 214 to capture a real-time camera view of a current user environment. In one embodiment, the user environment may include any environment having one or more spaces for reservation in which the user may interact with the reservation program 110a, 110b via an AR device 204 to determine an occupancy status of the spaces and/or reserve a space. For example, the user environment may include a room in a facility having one or more workspaces/meeting rooms for reservation. In another example, the user environment may include a train car having one or more seats for reservation.

According to one embodiment, once the user initiates the reservation program 110a, 110b (e.g., user selects or gestures for the option for "Find Space Now"), the visual input component 214 may direct a camera component of the AR device 204 to capture the camera view of the user environment. As previously described, the camera view may include a digital representation of the actual scene in the user environment. In one embodiment, the camera view may include a sequence of images that change dynamically as the AR device 204 (and thus the camera component) is moved around in the user environment. For example, if the camera component of the AR device 204 is directed towards the right side of a user environment, the camera view may capture images of the workspaces in the right side of the user environment and if the camera component of the AR device 204 is repositioned towards the left side of the user environment, the camera view may capture images of the workspaces in the left side of the user environment. According to one embodiment, the camera view may be displayed to the user via a display component (e.g., smartphone display) of the AR device 204. According to one embodiment, the reservation program 110a, 110b may dynamically update the camera view of the user environment responsive to movement of the AR device 204 in the user environment.

According to one embodiment, the reservation program 110a, 110b may implement the correlating component 216 to correlate the visual input of the camera view with the space reservation data 210 associated with the user environment. In one embodiment, the correlating component 216 may locate the AR device 204 (e.g., via GPS coordinates; indoor positioning data; and/or accelerometer data) relative to a space layout (e.g., space layout data 208) of the user environment. In one embodiment, the correlating component 216 may compare the location data and the camera view (e.g., visual input) of the user environment to determine each reservation space depicted in the camera view in real-time. In one embodiment, correlating component 216 may determine the unique space identifiers (e.g., workspace/workstation number; meeting room number) based on the location data and the camera view captured by the AR device 204. For example, the correlating component 216 may determine that workstations 1, 2, 3 and 4 are depicted in the camera view captured by the AR device 204.

Then the correlating component 216 may determine the reservation status of each of the spaces in the location of the AR device 204 and more specifically, each of the spaces depicted in the camera view captured by the AR device 204. In various embodiments, the reservation status may indicate that a space is available or booked. In some embodiments, the reservation status may provide more details, such as, for example, that a space is booked but the occupant is away (e.g., at lunch) or in a meeting. In at least one embodiment, the reservation status may also indicate a wait time for a booked space to become available. In at least one embodiment, the reservation status of a space may be updated by the occupant of a space (e.g., "away," "at lunch" or "in a meeting"). In other embodiments, the reservation status of a space may be automatically updated by a calendar entry of the occupant of the space.

According to one embodiment, the reservation program 110a, 110b may implement the augmenting component 218 to generate an interactive composite view (e.g., augmented view) including the user environment (e.g., in the camera view) and one or more computer generated information, such as, for example, a reservation status of a corresponding space (e.g., workspace) in the user environment. In one embodiment, the augmenting component 218 may display the augmented view of the user environment via the display component of the AR device 204. According to one embodiment, the reservation program 110a, 110b may dynamically update the augmented view of the user environment responsive movement of the AR device 204 in the user environment.

In one embodiment, the augmenting component 218 may transform the reservation status information into a digital artifact or 3D representation (e.g., graphical depiction) of the reservation status information which may then be added to the camera view of the user environment. In one embodiment, the reservation status information may be graphically depicted by a digital artifact, such as, for example, a 3D textbox or sign linked to each reservation space in the camera view of the user environment. In at least one embodiment, the digital artifacts representing the reservation status information in the augmented view may be user selectable to reserve an available space in the user environment. In various embodiment, the augmenting component 218 may also generate a digital artifact representing the name of the occupant at each space of the user environment. As such, the augmented view may also display the name of the occupant (with permission from the occupant) in addition to the reservation status of each space of the user environment. In one embodiment, the reservation program 110a, 110b may enable the user to search for a particular person (e.g., from the user's address book data) in the user environment and if that person is an occupant of one of the spaces, the augmented view may display the name of the person as a digital artifact linked to the corresponding space.

According to one embodiment, the reservation program 110a, 110b may implement the booking component 220 to process a request from the user to reserve an available space in the user environment. In one embodiment, the booking component 220 may detect a user selecting the digital artifact representing an available space reservation status in the augmented view of the user environment displayed on the AR device 204. In response to detecting the user selection, the booking component 220 may reserve the available space for the requesting user.

Figure 3:
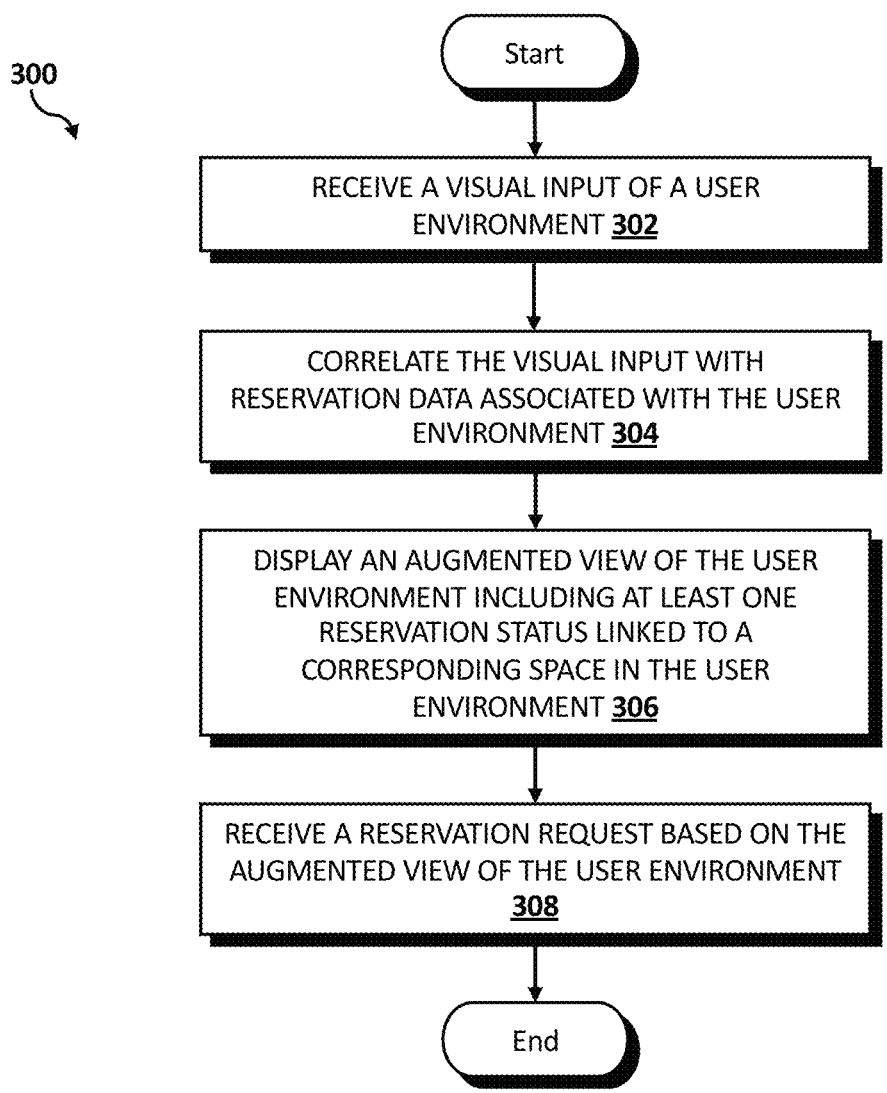
FIG. 3 is an operational flowchart illustrating a reservation process according to at least one embodiment.

Referring now to FIG. 3, an operational flowchart illustrating the exemplary reservation process 300 used by the reservation program 110a and 110b according to at least one embodiment is depicted.

At 302, a visual input of a user environment is received. In one embodiment, the reservation program 110a, 110b may implement the AR device to capture a real-time camera view of a current user environment.

Then at 304, the visual input is correlated with reservation data associated with the user environment. According to one embodiment, the reservation program 110a, 110b may compare the location data of the AR device and the camera view (e.g., visual input) of the user environment to determine each reservation space depicted in the camera view in real-time. In one embodiment, the reservation program 110a, 110b may determine the reservation status of each of the spaces in the location of the AR device and more specifically, each of the spaces depicted in the camera view captured by the AR device.

Then at 306, an augmented view of the user environment is displayed including at least one reservation status linked to a corresponding space in the user environment. According to one embodiment, the reservation program 110a, 110b may display (e.g., via the AR device) the augmented view as an interactive composite view of the user environment and one or more digital artifacts representing reservation status information and/or occupant name information.

Thereafter at 308, a reservation request is received based on the augmented view of the user environment. According to one embodiment, the reservation program 110a, 110b may enable the digital artifacts representing the reservation status information in the augmented view to be user selectable to reserve an available space in the user environment. In one embodiment, the reservation program 110a, 110b may detect a user selecting the digital artifact representing an available space reservation status in the augmented view of the user environment displayed on the AR device. In response to detecting the user selection, the reservation program 110a, 110b may reserve the available space for the requesting user.

Figure 4:
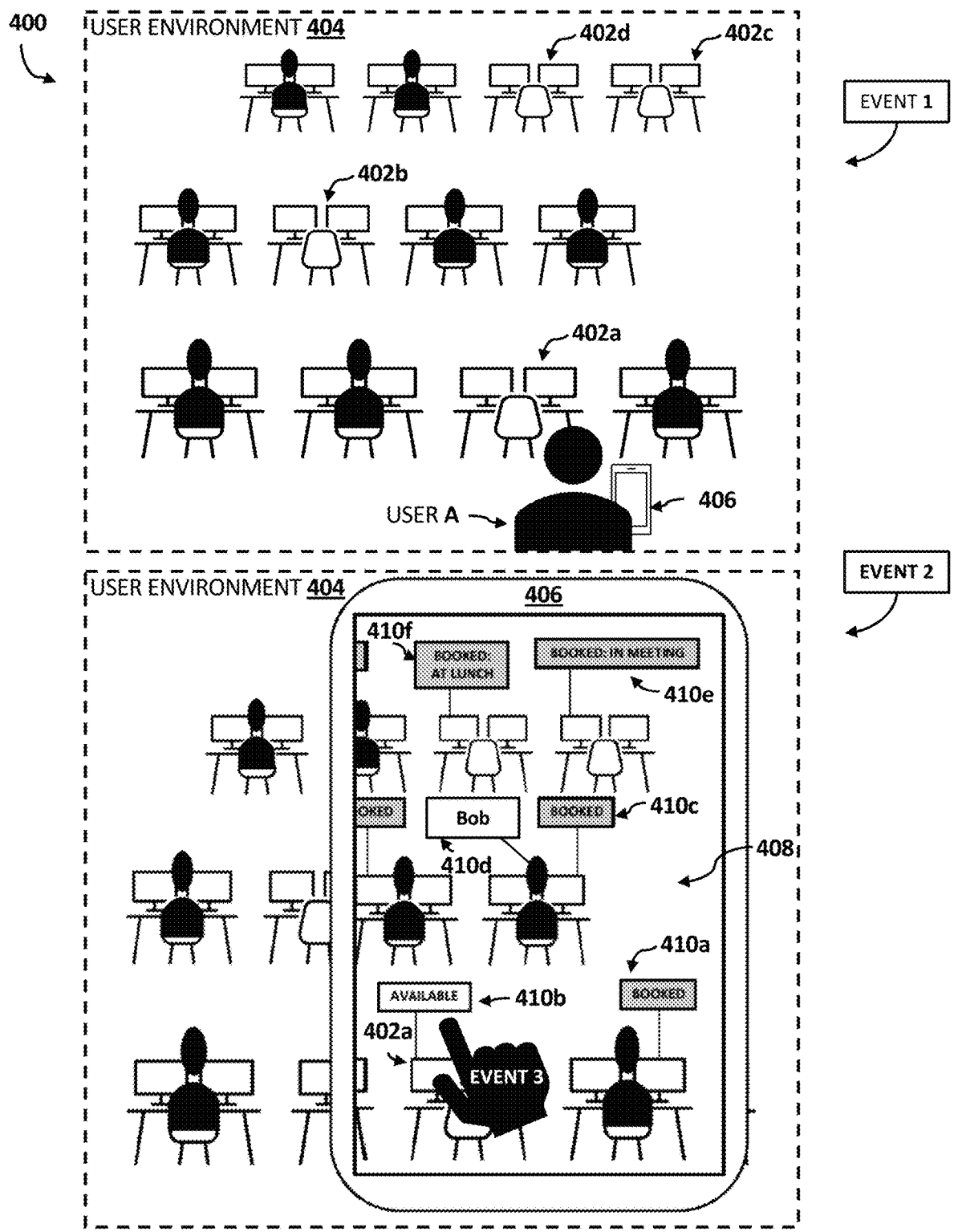
FIG. 4 is a block diagram illustrating an exemplary AR-based reservation process according to at least one embodiment.

Referring now to FIG. 4, a block diagram 400 illustrating an exemplary AR-based reservation process used by the reservation program 110a, 110b according to at least one embodiment is depicted.

User A works in an agile, open office environment in which workspaces are temporary and may be reserved for a set period of time. At event 1, user A arrives at the office and notices several open workspaces 402a-d in the user environment 404. However, user A is not sure which of the workspaces 402a-d are actually available for reservation. According to one embodiment, user A may include a hand-held AR device 406 (e.g., smartphone) running the reservation program 110a, 110b.

According to one embodiment, at event 2, user A may initiate the reservation program 110a, 110b. In one embodiment, the reservation program 110a, 110b may interact with one or more cameras of the AR device 406 to capture a real-time camera view 408 of the user environment 404.

According to one embodiment, the reservation program 110a, 110b may correlate the visual input of the camera view 408 with the space reservation data associated with the user environment 404. In one embodiment, the reservation program 110a, 110b may locate the AR device 406 and may compare the location data of the AR device 406 and the camera view 408 of the user environment 404 to determine the reservation spaces depicted in the camera view 408 in real-time. In one embodiment, the reservation program 110a, 110b may determine the reservation status of each of the spaces depicted in the camera view 408 captured by the AR device 406.

According to one embodiment, the reservation program 110a, 110b may generate an interactive composite view combining the camera view 408 of the user environment 404 and one or more digital artifacts 410a-f representing reservation status information and/or occupant name information. In one embodiment, once the digital artifacts 410a-f are depicted on the camera view 408, the camera view 408 may comprise an augmented view of the user environment 404. In one embodiment, digital artifacts 410a and 410c may represent a "booked" reservation status. In some embodiments, the reservation status may provide more details, such as, for example, that a space is booked but the occupant is away (e.g., digital artifact 410f representing away message "Booked: At Lunch" status) or in a meeting (e.g., digital artifact 410e representing "Booked: In Meeting" status). In one embodiment, the reservation program 110a, 110b may display the name of a person as a digital artifact (e.g., digital artifact 410d representing "Bob") linked to the corresponding space. In one embodiment, the digital artifact 410b may represent an "available" reservation status.

According to one embodiment, at event 3, user A may select the digital artifact 410b, representing the available workspace for reservation. In response to detecting the user selection of digital artifact 410b, the reservation program 110a, 110b may book workspace 402a for user A.

For at least the reasons detailed above, the functionality of a computer may be improved by the reservation program 110a, 110b. More specifically, the functionality of a computer may be improved because the reservation program 110a, 110b may enable the computer to generate a 3D representations of reservation data corresponding to spaces in a user environment and deploy the 3D representations into an augmented view of the user environment such that the user may interact with the augmented view to reserve a space in the user environment.

It may be appreciated that FIGS. 2 to 4 provide only an illustration of one embodiment and do not imply any limitations with regard to how different embodiments may be implemented. Many modifications to the depicted embodiment(s) may be made based on design and implementation requirements.

Figure 5:
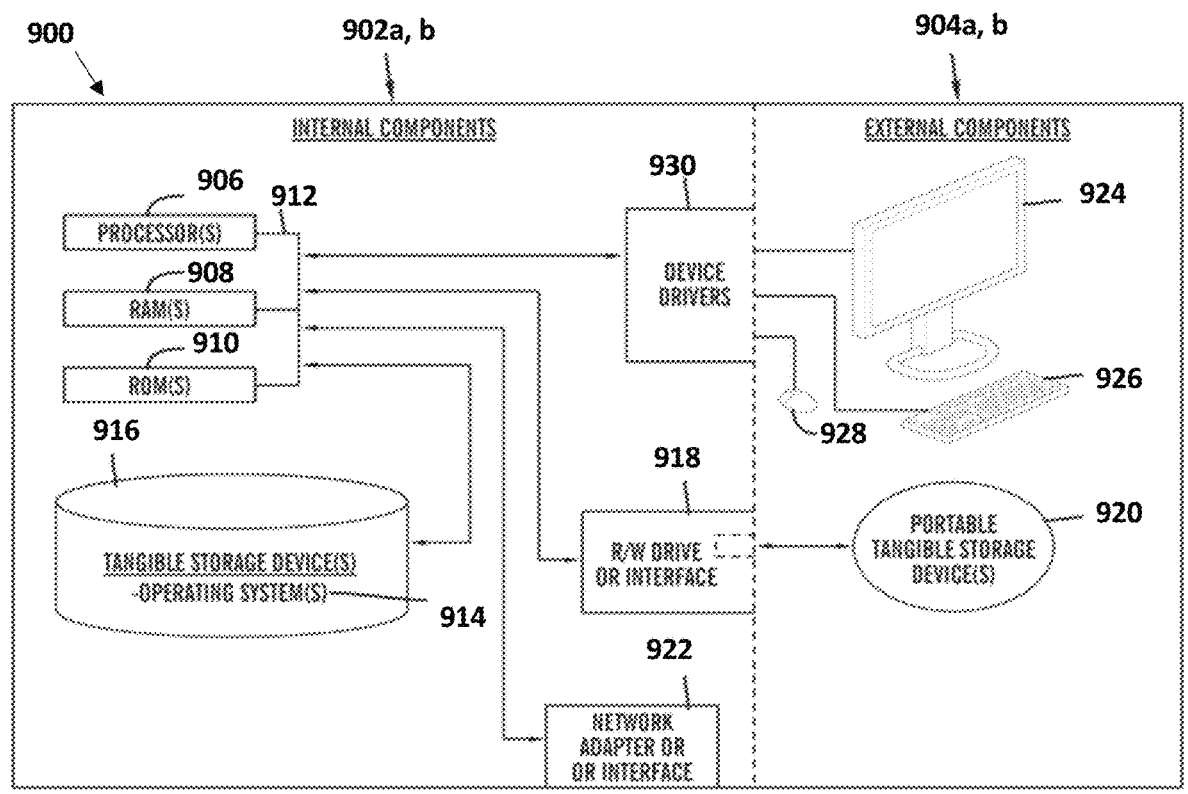
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 5. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the reservation program 110a in client computer 102, and the reservation program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the reservation program 110a and 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G, 4G, and/or 5G wireless interface cards or other wired or wireless communication links. The software program 108 and the reservation program 110a in client computer 102 and the reservation program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the reservation program 110a in client computer 102 and the reservation program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
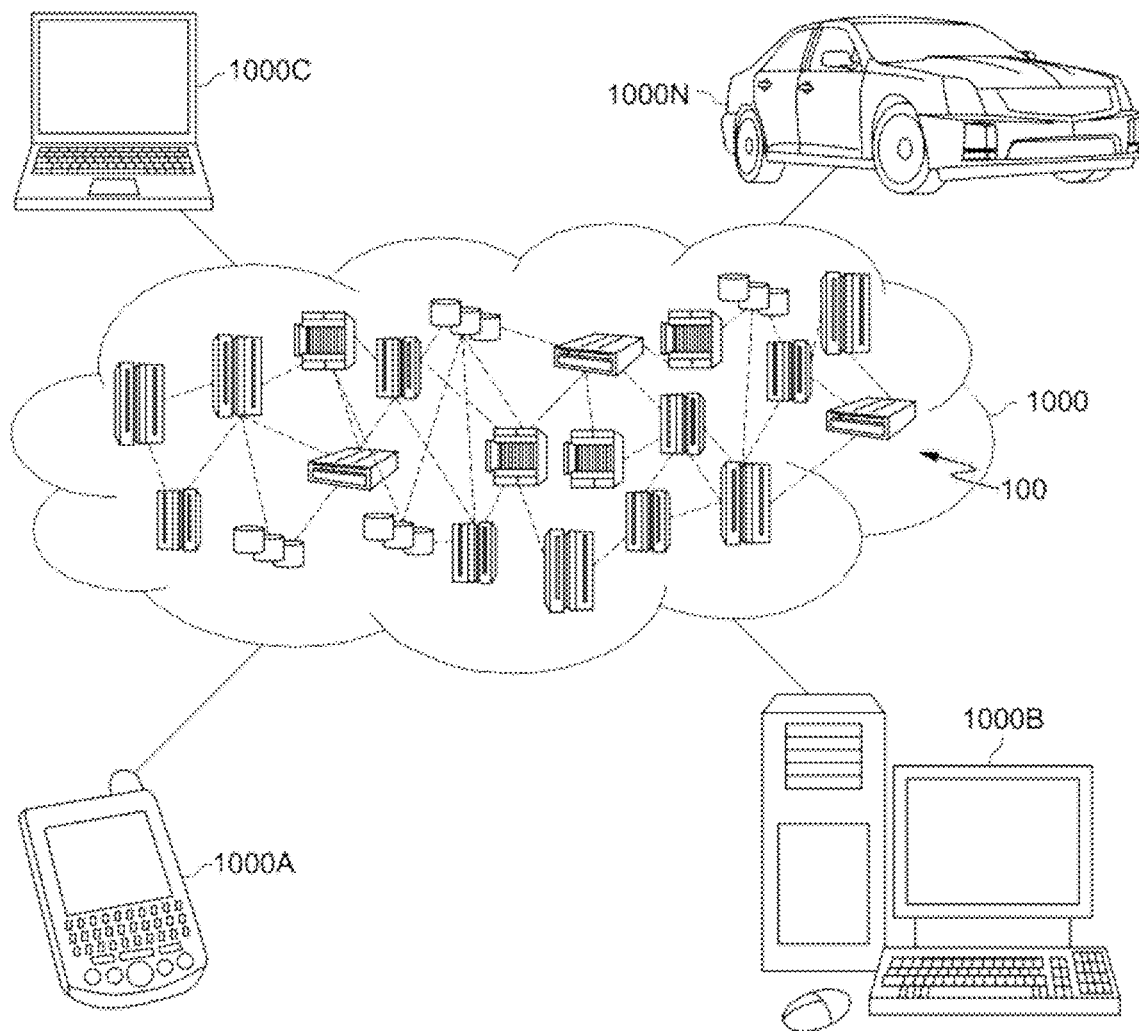
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
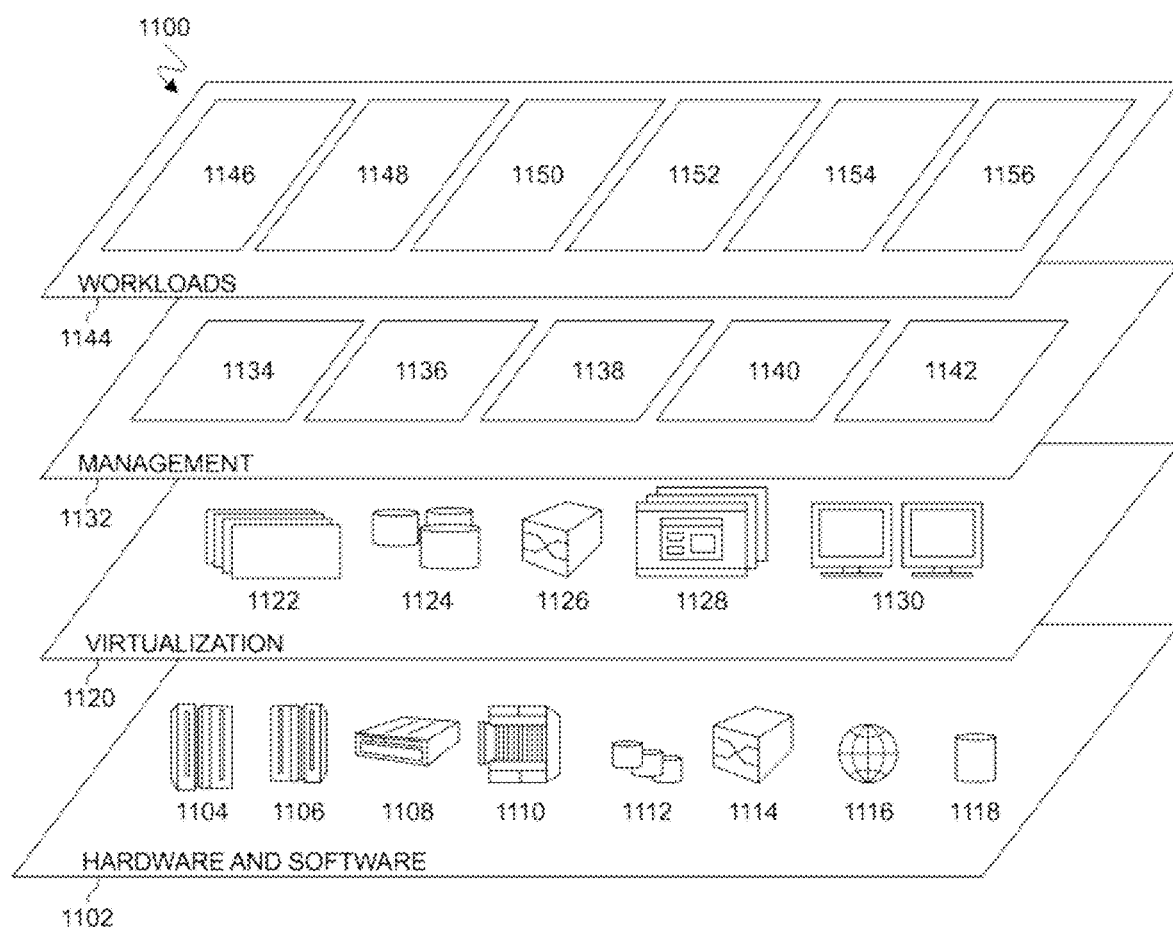
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and reservation processing 1156. A reservation program 110a, 110b provides a way to visualize a space occupancy status for reservation via an AR view of the user environment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, by an augmented reality (AR) device, a visual input of a user environment;
correlating, by the AR device, the received visual input with reservation data associated with the user environment;
displaying, by the AR device, an augmented view of the user environment including at least one reservation status linked to a corresponding space in the user environment, wherein the at least one reservation status is updateable in real-time by an occupant of the corresponding space to graphically indicate an update from a booked status to an away status associated with a vacancy in the corresponding space, wherein the away status indicates a reason for the vacancy in the corresponding space that is booked by the occupant; and
receiving, by the AR device, a reservation request based on the augmented view of the user environment.

2. The method of claim 1, wherein receiving the visual input of the user environment further comprises: capturing a real-time camera view of the user environment.

3. The method of claim 1, further comprising:
determining a location data of the AR device;
comparing the determined location data of the AR device with the received visual input of the user environment to determine each space depicted in the received visual input; and
associate a corresponding reservation status to each space depicted in the received visual input.

4. The method of claim 1, further comprising:
transforming the at least one reservation status into a digital artifact graphically representing the at least one reservation status; and
generating an interactive composite of the received visual input of the user environment and the digital artifact linked to the corresponding space in the user environment.

5. The method of claim 1, wherein receiving the at least one reservation request based on the augmented view of the user environment further comprises:
detecting a user selection of a digital artifact representing an available reservation status in the augmented view of the user environment.

6. The method of claim 1, wherein the at least one reservation status is updateable in real-time by the occupant of the corresponding space to graphically indicate the update from the booked status to the away status further comprises:
automatically updating the at least one reservation status responsive to a calendar entry of the occupant of the corresponding space.

7. The method of claim 1, further comprising:
transforming the at least one reservation status into a digital artifact, wherein the digital artifact includes a three-dimensional (3D) representation of the at least one reservation status in the augmented view of the user environment.

8. The method of claim 1, wherein the at least one reservation status depicted in the augmented view is selected from the group consisting of: the booked status, an available status, the away status, and a meeting status.

9. The method of claim 1, wherein the at least one reservation status depicted in the augmented view includes a wait time for a booked space to become available.

10. A computer system for real-time space reservation using augmented reality (AR), comprising:
one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
receiving, by an augmented reality (AR) device, a visual input of a user environment;
correlating, by the AR device, the received visual input with reservation data associated with the user environment;
displaying, by the AR device, an augmented view of the user environment including at least one reservation status linked to a corresponding space in the user environment, wherein the at least one reservation status is updateable in real-time by an occupant of the corresponding space to graphically indicate an update from a booked status to an away status associated with a vacancy in the corresponding space, wherein the away status indicates a reason for the vacancy in the corresponding space that is booked by the occupant; and
receiving, by the AR device, a reservation request based on the augmented view of the user environment.

11. The computer system of claim 10, wherein receiving the visual input of the user environment further comprises:
capturing a real-time camera view of the user environment.

12. The computer system of claim 10, further comprising:
determining a location data of the AR device;
comparing the determined location data of the AR device with the received visual input of the user environment to determine each space depicted in the received visual input; and
associate a corresponding reservation status to each space depicted in the received visual input.

13. The computer system of claim 10, further comprising:
transforming the at least one reservation status into a digital artifact graphically representing the at least one reservation status; and
generating an interactive composite of the received visual input of the user environment and the digital artifact linked to the corresponding space in the user environment.

14. The computer system of claim 10, wherein receiving the at least one reservation request based on the augmented view of the user environment further comprises:
detecting a user selection of a digital artifact representing an available reservation status in the augmented view of the user environment.

15. The computer system of claim 10, wherein the at least one reservation status is updateable in real-time by the occupant of the corresponding space to graphically indicate the update from the booked status to the away status further comprises:
automatically updating the at least one reservation status responsive to a calendar entry of the occupant of the corresponding space.

16. The computer system of claim 10, further comprising:
transforming the at least one reservation status into a digital artifact, wherein the digital artifact includes a three-dimensional (3D) representation of the at least one reservation status in the augmented view of the user environment.

17. The computer system of claim 10, wherein the at least one reservation status depicted in the augmented view is selected from the group consisting of: the booked status, an available status, the away status, and a meeting status.

18. The computer system of claim 10, wherein the at least one reservation status depicted in the augmented view includes a wait time for a booked space to become available.

19. A computer program product for real-time space reservation using augmented reality (AR), comprising:
one or more computer-readable storage media and program instructions collectively stored on the one or more computer-readable storage media, the program instructions executable by a processor to cause the processor to perform a method comprising:
receiving, by an augmented reality (AR) device, a visual input of a user environment;
correlating, by the AR device, the received visual input with reservation data associated with the user environment;
displaying, by the AR device, an augmented view of the user environment including at least one reservation status linked to a corresponding space in the user environment, wherein the at least one reservation status is updateable in real-time by an occupant of the corresponding space to graphically indicate an update from a booked status to an away status associated with a vacancy in the corresponding space, wherein the away status indicates a reason for the vacancy in the corresponding space that is booked by the occupant; and receiving, by the AR device, a reservation request based on the augmented view of the user environment.

20. The computer program product of claim 19, wherein receiving the visual input of the user environment further comprises: capturing a real-time camera view of the user environment.

* * * * *